Nov. 17, 1925.                                                    1,561,506
R. CHILTON
ENGINE STARTER
Filed April 12, 1924          3 Sheets-Sheet 3
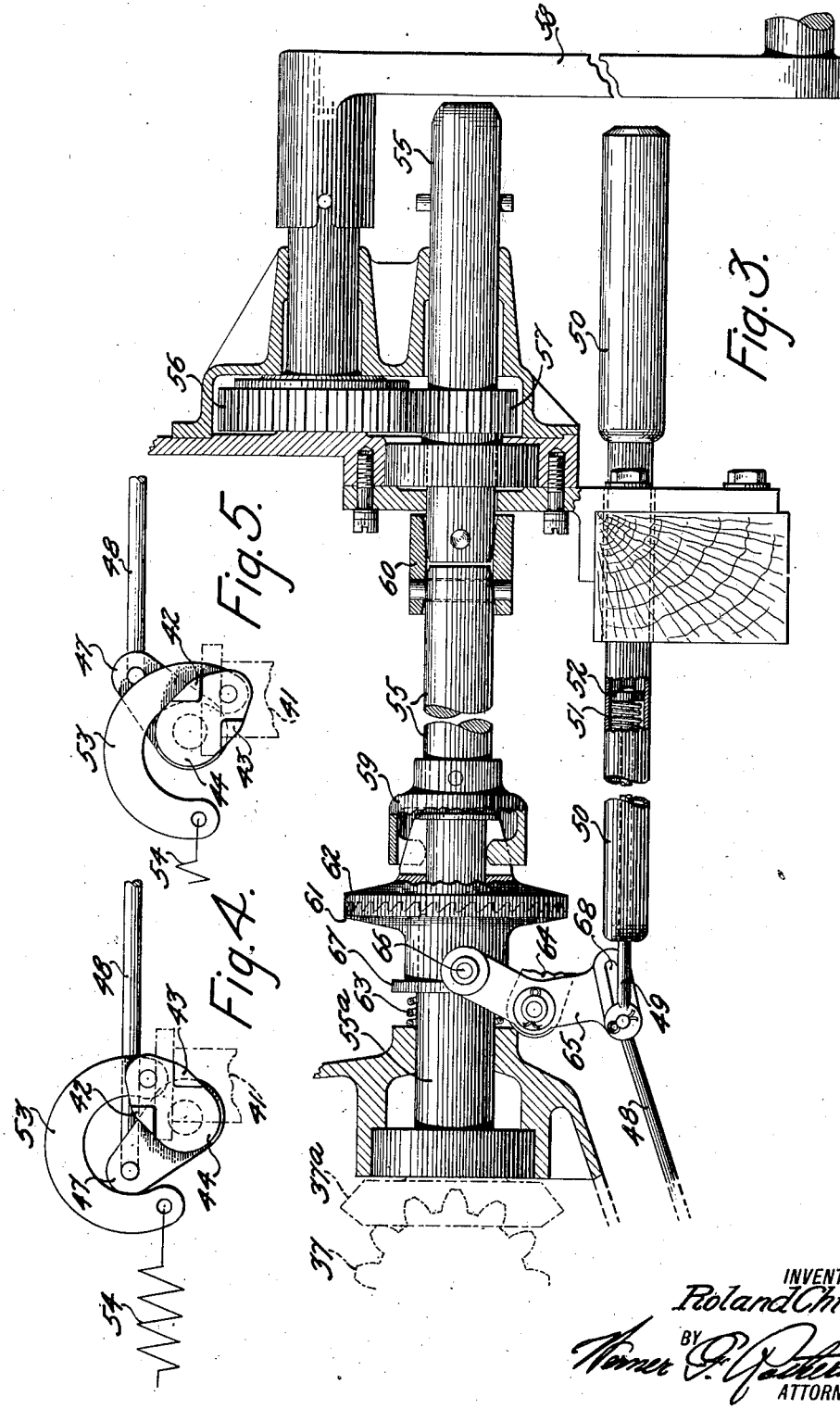
INVENTOR
Roland Chilton
BY
ATTORNEY Patented Nov. 17, 1925.

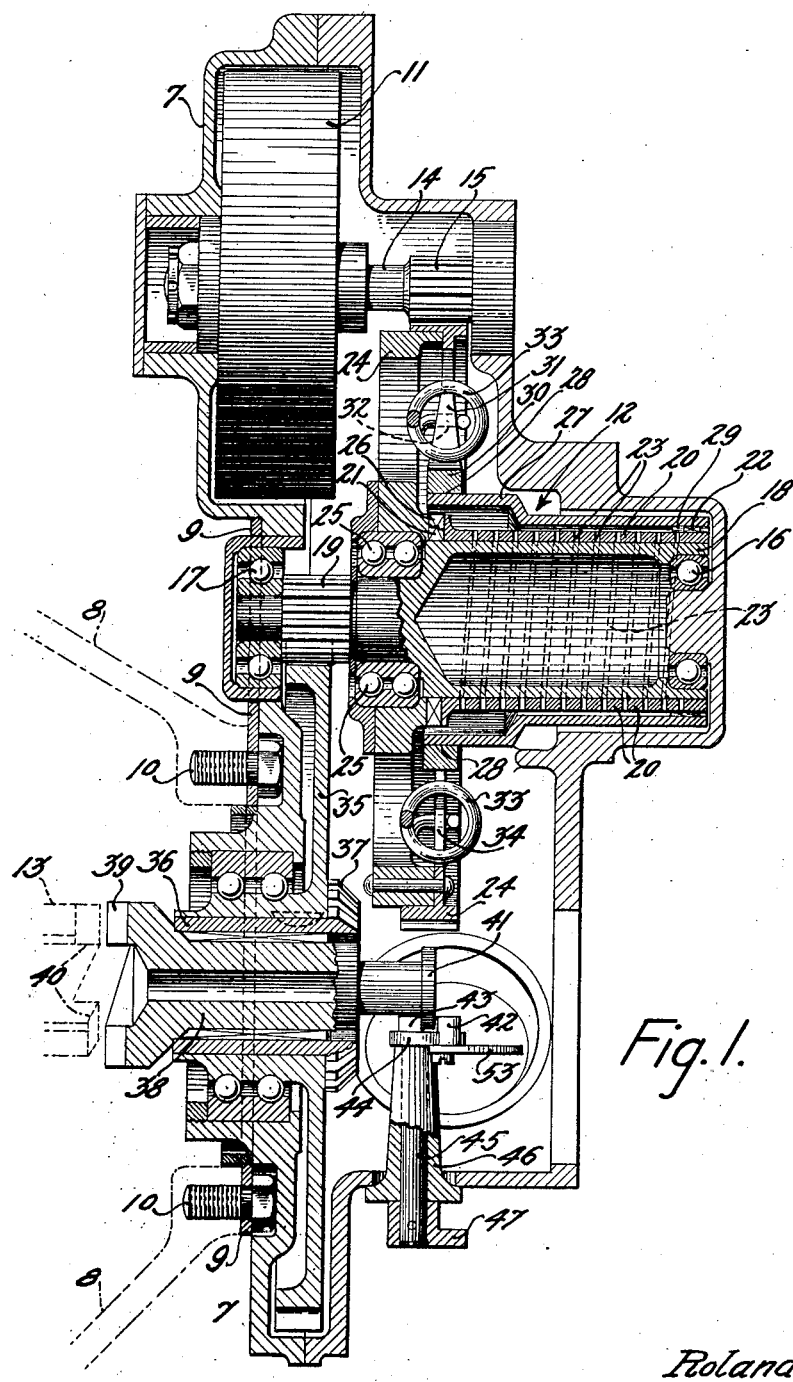

1,561,506

UNITED STATES PATENT OFFICE.

ROLAND CHILTON, OF KEYPORT, NEW JERSEY, ASSIGNOR TO AEROMARINE PLANE & MOTOR COMPANY, INC., A CORPORATION OF NEW YORK.

ENGINE STARTER.

Application filed April 12, 1924. Serial No. 706,142.

*To all whom it may concern:*

Be it known that I, ROLAND CHILTON, a subject of the King of England, and a resident of Keyport, in the county of Monmouth and State of New Jersey, have invented certain new and useful Improvements in Engine Starters, of which the following is a specification, reference being had to the accompanying drawings, forming part of this specification.

This invention relates to means for storing energy and delivering the same at a high rate of output for doing work of a nature requiring a greater effort extended over a short space of time than the source of power available is adapted to develop. The present embodiment relates more specifically to the starting of internal combustion engines, and features a means especially adaptable to starting the larger or heavier types associated with aircraft where a great effort is desired for a short space of time only. For this purpose manual energy as well as electrical energy are in common use for the operation of devices where the energy must be developed at the same rate at which it is absorbed by the engine. To obtain the relatively high cranking speeds desired to insure prompt starting entails a greater rate of energy output than can be directly applied manually, and the practical limitations on the weight of existing electrical equipment also limit the rate at which energy can be delivered to the engine to be started with conventional starting means.

This invention contemplates means whereby the energy required is temporarily stored as in a fly-wheel or other mass so that it may be accumulated by less effort and extended over a longer period, than would be the case in direct cranking, and then applied as a relatively great effort extending over a shorter time.

On account of the large torque requirements for cranking the larger engines, relatively high gear reductions are resorted to in order to keep down the effort required; this results in an undesirably low cranking speed which commonly causes the start to be delayed. The total amount of energy put into an engine in the case of a delayed start characteristic of the existing apparatus, is sufficient to turn the engine over for a shorter period at much greater speed. This invention aims at providing practical means whereby the available energy may be applied to the crank-shaft at greater rate than that at which such energy is developed.

It will be seen that the torque effort exerted by the energy source in existing cranking devices must be sufficient to turn the engine over under the most adverse conditions as to stiffness. By utilizing the storage principle as contemplated in this invention, the torque applied by the energizing means may be of any convenient amount providing only it is continued long enough to accumulate the necessary energy. Experience has shown that if an internal combustion engine be rotated at 100 R. P. M. or more, it will start firing in less than two revolutions, even under adverse conditions, providing the engine is in condition to function at all. With manual operation it is quite impossible to produce any such speed, six or seven revolutions per minute being about as much as is realized with manual cranking on aircraft engines of considerable size, while the heaviest electrical apparatus considered practical for aircraft use produces an engine speed of about 25 R. P. M., which speeds are insufficient to insure prompt starting except under the most favorable conditions.

This invention contemplates the use of a fly-wheel or other mass capable of being accelerated to high speed as the storage means. The energy kinetically stored in a moving body is a function of its mass and the square of its velocity, so that by utilizing high velocities relatively small masses are adequate. For instance, a small fly-wheel of 3⅓ lbs. weight operating at 130 times crank shaft speed is equivalent as to stored energy to a fly-wheel mass of 1,000 lbs. 3 ft. diameter applied directly to the crankshaft. Accordingly, a gear reduction between the fly-wheel of this invention and the crankshaft of the engine to be started is utilized and the same reduction gear may conveniently be used as the means for driving the fly-wheel from the source of power during the energizing process, when the gear train will be disconnected from the engine shaft.

The principal difficulty in the way of applying the stored energy in a high speed flywheel to the starting of engines has been to devise means whereby the rapidly revolving wheel can be connected to the engine to be started without engendering excessive loads at the instant of engagement. Conventional forms of friction clutches are unsatisfactory for this purpose because the load at which such clutches slip depends upon the condition of the friction surfaces which changes rapidly when slipping occurs. This invention contemplates the use of a special calibrated form of friction clutch such as is featured for example in the copending application of Hayes, Ser. No. 649,089 Filed July 2, 1923. In this device friction surfaces are loaded by means of a spring which is also subject to the driving load and the parts are so organized that the friction applying load of the spring is relieved by an excessive driving load so that the connection slips at the same pre-determined effort regardless of the condition of the friction surfaces. In conventional types of friction clutches on the other hand, the slipping point is directly proportional to the coefficient of friction which may vary over a wide range according to temperature, lubrication, and other conditions.

It will be seen that the point at which this device yields should always be in excess of the maximum effort required to turn the engine, while it must also always be within the strength of the parts. This will be a narrow margin if the parts are to be of minimum weight and hence the importance of a slipping device that will constantly exert the same torque effort. It is a well-known characteristic of friction surfaces that the friction of rest is much greater than the friction under movement, in other words, that the effort required to initiate slipping is very much greater than the effort required to continue the movement after the surfaces have "broken away". This is an additional reason why the application of conventional friction clutches for the purpose here contemplated is impracticable. With the calibrated form of slipping clutch such as exemplified in the copending application above mentioned the break-away torque is the same as the torque developed under subsequent slipping and the combination of such a slipping means with a fly-wheel means for the purposes set forth is one of the principal features of this invention.

A specific object of this invention is to provide a light and efficient means whereby a relatively high starting speed may be impressed on the engine from a manual source and whereby the rate at which energy is applied to the engine is much greater than the rate at which an operator can develop such energy. For example, if the operator be capable of exerting one-fifth of a horsepower for twenty seconds and if upon engagement with the engine the starter is then brought to rest in two seconds the energy will be applied at the rate of two horsepower during the cranking process.

A further object of the invention is to reduce the effort needed in cranking a relatively large engine. It will be seen that in direct cranking the effort necessary is proportional to the resistance offered by the engine. With the device here described, the operator can set his own pace in bringing the fly-wheel up to speed and, on engagement with the engine, the torque available is determined by the setting of the slipping clutch which is limited only by the strength of the parts.

Another object of this invention is to provide a means whereby stored energy may be accumulated immediately before use and thus avoid the loss of energy associated with storage over protracted periods, as by compressed air or by electrical storage.

Another object of the invention is to provide a means for accumulating energy suitable for starting engines, or for similar uses, which shall be of substantially less weight than such storage means as compressed air tanks or electrical batteries.

Another object of the invention is to provide means for accumulating and utilizing energy from a source, such as manual power, that will be available under all operating conditions.

Another object of this invention is to provide means for accumulating energy, for engine starting or other short-interval power need, which may be independent of power driven generators.

Various other objects and advantages of the invention will be in part obvious from an inspection of the accompanying drawings and a careful consideration of the following particular description and claims of one form of mechanism embodying my invention.

In the drawings:

Figure 1 is a vertical section of the device taken approximately at the center.

Figure 3 illustrates a two speed manually operated driving means, partly in section, a portion of which is shown in Fig. 1.

Figure 4 is a plan view on an enlarged scale illustrating the normal position of a means adapted to axially shift a driven clutch to engage the engine shaft.

Figure 5 is a view showing the shifted position of the elements illustrated in Fig. 4.

Figures 2, 6:
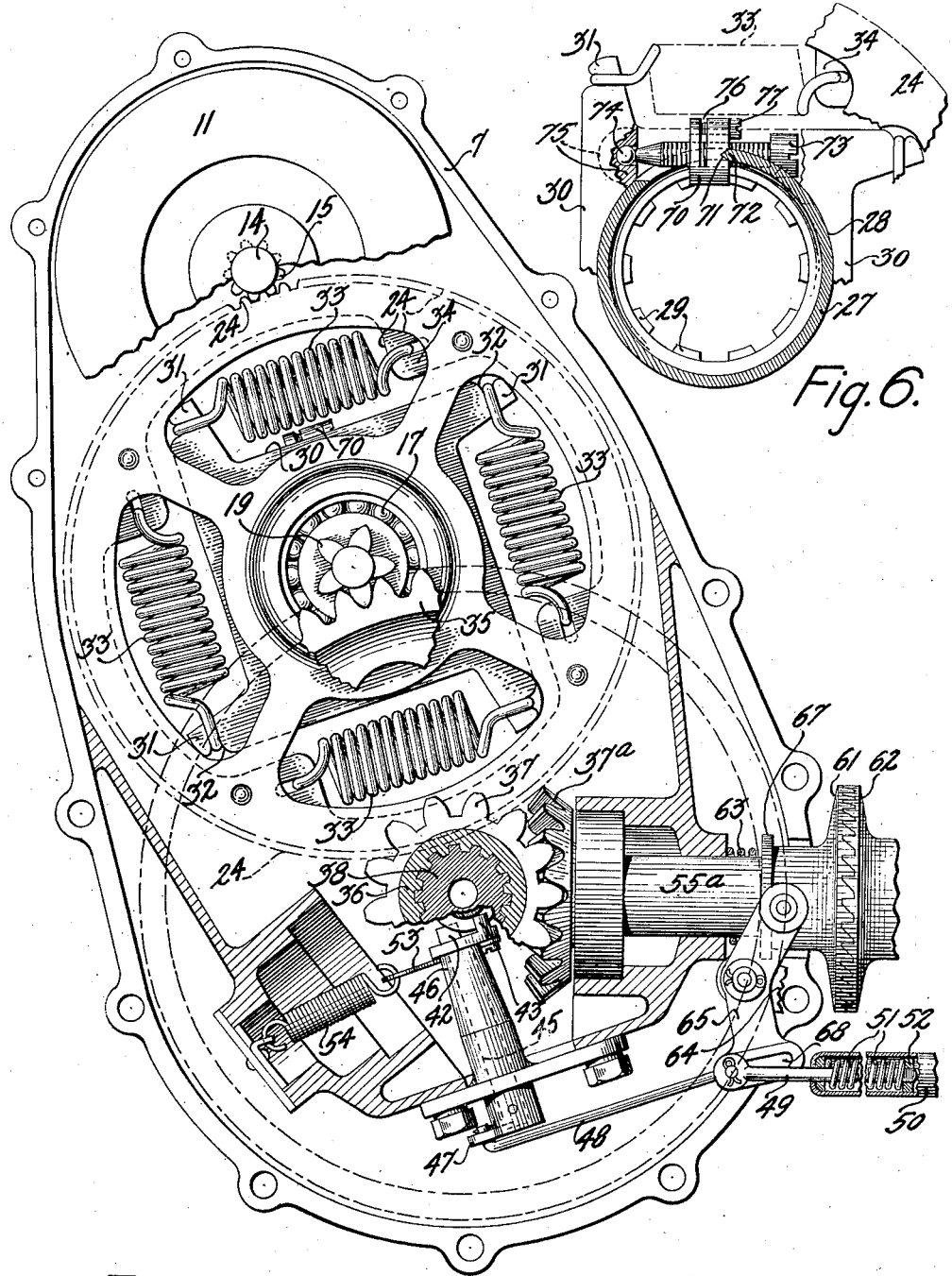
Figure 2 is an open end view looking from the engine side with some of the parts broken away for the sake of clearness.
Figure 6 illustrates in detail a provision for adjusting the tension of a spring means.

In the present instance 7 designates a casing attached to the engine 8 as by a plate and screws 10. In the casing there is mounted in suitable bearings, an engine starting mechanism comprising a reduction gear train adapted to drive or to be driven from a fly-wheel 11. Embodied in this gear train is a calibrated form of friction clutch 12 such as is featured in the copending application hereinbefore mentioned and which is adapted to control the load applied to the engine shaft 13.

On a shaft 14, there is secured the flywheel 11 and a pinion 15.

Rotatably supported in the bearings 16, 17 is a drum 18, said drum being provided with a pinion 19. Surrounding the drum 13 there is mounted a helically formed friction band 20 adapted to engage the drum and provided at both ends with a series of splines 21, 22. The friction band is preferably formed integral with the splines thereon and can conveniently be constructed as a cylinder with a helical slot 23 cut therein so as to form the coil; in this manner a more accurate fit can be provided between the friction band and the drum than could be obtained by winding a band to form the coil.

Meshing with the pinion 15 is a gear member 24 rotatably supported on the anti-friction bearings 25 in a manner so as to permit of it having frictionless relative rotary motion to the drum 18, said gear being provided with a series of splines 26 adapted to interlock with the splines 21 of the friction band.

Surrounding both the drum and the friction band 20 is a floating cylindrical member 27 one end of which is provided with a series of splines 29 to engage the splines 22 of the friction band.

Mounted on the member 27 in a rotationally adjustable manner as at 28, (Figs. 1 and 6) is a spider 30 having a plurality of projections 31 provided with notches 32 in which are supported one end of a set of springs 33, the other end of the springs being secured to the gear 24 by means of slotted lugs 34 forming part of the gear. These springs are introduced into the mechanism under some initial tension so as to wind up the band 20 on the drum for maintaining sufficient frictional engagement therewith to drive the same. The springs 33 which generate this friction are so disposed as to tend to advance the spider 30 relative to the gear 24 whereby a winding up or tightening action is imposed on the band 20 by virtue of the spline connection between the cylindrical member 27 and the friction band 20. It will be seen that the gear 24 and the connection comprising the splines 21, 26 does not transmit the driving torque to the friction band but that it takes the reaction due to the winding up action of the springs on the band 20. The drive is transmitted from the gear to the cylindrical member 27 through the springs 33 and from the cylindrical member to the band by the splines 22, 29, the parts being so organized as to tend to unwind the band in opposition to the spring action.

It is characteristic of a band such as that shown and described that a very small winding up tendency between its ends results in a relatively great driving friction. It will be seen that in addition to exerting the winding up action on the band, the springs function as the only means of drive transmission between the spider 30 and the gear 24. Only a small portion of the tension exerted by the springs is used to maintain adequate frictional contact of the band on the drum by the winding up action, the main portion of the tension of said springs being employed in transmitting the drive. It is a requisite in devices of this kind that in order to obtain good calibration only a small proportion of the force exerted by the springs be used to generate adequate frictional contact between the driving and the driven means.

Provision is made for adjusting the releasing torque of the device by adjusting the tension of the springs 33 in the following manner: With reference to Fig. 6 there is shown a nut 70 having a V groove 71 which is engaged by a knife-edge portion 72 of the cylindrical member 27. In the nut 70 there is disposed an adjusting screw 73 of which a ball end 74 engages a suitable depression in a boss 75 formed on the spider 30. The nut 70 is split as at 76 and a locking screw 77 is provided for the purpose of locking any adjustment made. It will be seen that the advancement or retraction of the screw 73 will cause relative rotary motion of the spider on the cylindrical member 27, and variations in the relative angular disposition of the spider and the gear 24; the cylindrical member being splined to one end of the friction band 20, and the gear 24 splined to the opposed end of the band, any desired degree of tension within the range of the device can be provided in the springs 33 by the adjustment of the screw 73.

It will be seen that the cylindrical member 27 with its associated spider is sustained only at the point of engagement with the friction band, and that ample clearance is provided between said band and the cylindrical member. This is for the purpose of preventing side pressures being imposed on the band which would effect the calibration thereof.

A gear 35 meshes with the pinion 19 of the drum and is provided with a splined hollow hub 36 having a bevel gear portion 37 meshing with a companion gear 37ª mounted on an extension drive shaft 55ª. Rotatable with and axially shiftable in the hollow hub is a meshing member 38 having at one end clutch jaws 39 adapted to engage similar clutch jaws 40 on the engine shaft 13. The other end of the member 38 is provided with an annular flange 41 which is positioned between two cam portions 42, 43 of a shifting mechanism. These cam portions are formed integral with a head 44 having a shank 45 which is rotatably supported in a bearing 46. The lower portion of the shank is fitted with an arm 47 which is connected by a link 48 to a rod 49 slidably mounted within an operating handle 50. The rod is secured in the handle 50 in a yieldable manner by the spring 51 and the nut 52, the function of which will be more fully described hereinafter.

In Figs. 4 and 5 there is shown in detail the two positions of the shifting mechanism forming in part what is generally known as a toggle-joint and in which a bent link member 53 is pivotally connected at one end to the head 44, the other end of the bent link being connected to a tension spring 54 suitably anchored as shown in Fig. 2. The shifting of the meshing member 38 is accomplished in the following manner: The handle 50 is manually drawn towards the right causing the spring 51 therein to yield and at the same time exerting a gradually increasing tension on the spring 54 by virtue of the intermediate connection. When sufficient pull has been imposed on the handle 50 for the spring 51 to overcome the power of the spring 54, the shifting mechanism comprising the bent link 53 and the head 44 with its associated cams 42, 43 will be suddenly moved with great acceleration from position Fig. 4 to position Fig. 5, the cams snapping the meshing member 38 into engagement with the engine shaft.

With reference to Fig. 3 there is shown a two-speed driving mechanism in which a drive shaft 55 is operated either directly or through the gears 56, 57 by a means such as the crank handle 58. The connections 59, 60 provide universal joints in the shaft 55. Rotatable with and axially shiftable on the extension shaft 55ª is a one-way clutch member 61 normally maintained in an engaged position by a spring 63 with a similar clutch member 62 rotatably mounted on the same shaft.

Pivotally mounted on a suitable fulcrum 64 formed on the casing, is a rocker arm 65 the upper portion of which is bifurcated so as to embrace the clutch member 61. In each limb of the bifurcated portion there is secured a trunnion 66 adapted to engage a flange 67 on the clutch member. The lower portion of the rocker arm has an elongated slot 68 formed therein in which there is supported the connection between the link 48 and the rod 49.

The operation of the device is as follows:

When it is desired to start the engine, the crank handle 58 is operated so as to rotate the fly wheel 11 through the shafts 55, 55ª, bevel gears 37, 37ª, the gear train and the friction clutch until the fly wheel has assumed extremely high velocity, when further driving effort is discontinued. The handle will now come to rest due to the overrunning action of the one-way clutch members 61, 62.

The stored energy of the fly wheel is now to be applied to the engine shaft 13 which is at rest and to this end the handle 50 is manually drawn to the right, (Fig. 3). This action will cause the spring 51 to yield until the compression thereof has reached sufficient intensity to over-come the tension of the spring 54 when the meshing member 38 will be snapped into engagement with the engine shaft as hereinbefore described. When the above meshing takes place the rocker arm 65 is rocked about its fulcrum and moves the clutch member 61 away and free from its companion as a precaution against the sudden reversal of the crank handle by a possible backfire in the engine.

As the fastly rotating fly-wheel is suddenly connected to the engine which is at rest, excessive resistance would be imposed upon the mechanism due to the inertia of the engine mass if some yielding means were not incorporated in the starter gear train. The friction clutch as herein disclosed provides an improved means for this purpose.

It will be understood that when such an overload is imposed on the mechanism the springs 33, which are set to transmit a predetermined load, will tend to yield and initiate relative motion between the gear 24 and the spider 30 that will result in a slight unwinding action on the band 20 and which will permit a slipping of the drum 18. Under the torque generated by this slipping the engine will be rapidly brought up to the speed corresponding to the speed of the flywheel and thereafter the fly-wheel and engine will continue rotating at the relative speeds preset by the gear train until such time as the engine starts or until the kinetic energy in the wheel is exhausted.

When the engine begins to function and overruns the starting mechanism the meshing member 38 will be started out of engagement with the engine shaft due to the angular construction of the jaws 13, 39 and fully retracted with a snappy action by means of the spring 54 which acts to retract the mesh member 38 as soon as the cam 42 has passed the dead center position.

In the drawing the hand crank shaft 55 is shown disposed transversely to the axis of the meshing member and connected thereto by the bevel gears 37, 37ª. In cases where a longitudinally disposed cranking handle is convenient this may be drivably connected to the meshing member or to any other convenient shaft of the gear train and such dispositions are obviously within the scope of this invention.

With respect to Fig. 2 there it is shown that the driving mechanism can also be transposed from right to left if found to be more accessible when located in that position.

Whereas in the present instance a manually operative drive is shown, it is also considered within the scope of the invention to resort to any alternative energizing means such as for example a motor using stored energy generated by the engine whilst running.

It will be seen that in starter mechanisms of the type disclosed the highest loads put upon the mechanism occur at the pinion 19 and its supporting bearing 17.

As explained in my co-pending application, Ser. No. 471,002, filed May 19, 1921, in order to obtain compactness in starter gears it is desirable to use as few teeth as possible on the pinion, and a special construction whereby a pinion having as few as five teeth is given adequate strength for the purpose is disclosed in said copending application.

In the case of aircraft engines, extreme lightness is of paramount importance, and to this end the casing 7 would probably be made of aluminum or other light alloy. The adequate support of the highly loaded pinion bearing by a casing of such an alloy presents difficulties and accordingly the steel plate 9 is made to surround this pinion bearing so that the principal loads are transmitted directly through this plate to the engine casing 8 which is the anchorage for the entire starter.

It will be seen in Fig. 1 that the casing 7 is so constructed as to provide a relatively narrow extension enclosing the gear 35 which is disposed adjacent to the opening in the engine 8 while the casing to the rear of the gear is made of relatively small radius. This is for the purpose of providing clearance to avoid interference with such engine accessories as have led to undesirable restrictions in the diameter of the driving gear in some starters of the prior art.

Variations may be resorted to within the scope of the invention and portions of the improvements may be used without the others, whilst not departing from the spirit of the invention.

Having thus described my invention, I claim:—

1. In apparatus of the class described, the combination with a means to be started, of a hand crank, a fly-wheel, gearing therebetween adapted for the relatively high speed rotation of the fly-wheel from the crank and for the low speed driving of the means to be started from said fly-wheel, a spring driving means operated by the gearing, a friction driving means coacting with said spring driving means and adapted to slip upon the yielding of said spring driving means.

2. In apparatus of the class described, the combination with an engine to be started, of a fly-wheel, a reduction gear train, a preset spring means, a normally disengaged clutching means driven from a gear in said train, and a normally engaged connection associated with the gear train, said normally engaged connection having a driving and a driven surface adapted for unitary movement by friction producing pressure engendered by said spring and by the reduction of said friction producing pressure for the advance of the driving surface relatively to the driven surface whenever the driving load exceeds the pre-set limit.

3. As a new article of manufacture, an engine starting mechanism, comprising a power member, a fly-wheel means, a drive transmitting connection therebetween, said fly-wheel means adapted to rotate the engine for starting by virtue of energy impressed in said fly-wheel by the power member, and automatically controlled frictional engaging means in said connection adapted to restrain the force of said fly-wheel energy upon the mechanism when a resistance in excess of a predetermined amount is encountered.

4. As a new article of manufacture, an engine starting mechanism including a power means, a drive transmitting spring means, a clutch driven through said spring means and actuated for slipping by the yielding of said spring means under excessive driving loads, and a fly-wheel mounted for rotation and adapted to absorb energy from said power means for subsequent application through the clutch to the engine to be started.

5. In a device of the class described, the combination with an internal combustion engine having a drive shaft, of a fly-wheel, a gear train, a friction clutch in said gear train organized to transmit a predetermined load from the fly-wheel to the engine shaft, a shiftable member driven from said fly-wheel and adapted to engage the engine drive shaft for starting, means for moving the shiftable member into and out of engagement with the engine drive shaft, and a means to rotate the fly-wheel to high speeds through said gear train.

6. In apparatus of the class described, the combination with an engine to be started, of a power means, a gear train, a momentum member adapted for rotation from the power applied through the gear train, a clutch member drivable from the momentum member and adapted to be shifted into and out of engagement with the engine, a load limiting clutch comprising a drum, a helical constrictable member frictionally engaging the drum, a pair of elements engaging either end of the helical member, and spring means between said elements to produce friction producing pressure of the helical member on the drum, one of said elements forming a gear in said train and transmitting torque to the other element through said spring means.

7. A starter for an internal combustion engine, comprising in combination, a flywheel adapted to be rotated to relatively high speeds, gearing means to connect the fly-wheel for the rotation of an engine to be started at relatively lower speed, a preset driving spring, and a clutch associated with said gearing means; said clutch being adapted to slip upon the yielding of said spring.

8. A starting device for an engine, comprising in combination, a gear train including a high speed shaft and a low speed shaft, a fly-wheel on the high speed shaft, means for bringing the fly-wheel to a high speed of rotation, means for connecting the low speed shaft to an engine to be started, in combination with a clutch associated with said gear train and adapted to slip under a predetermined driving effort, and means incorporated in said clutch whereby variations in the coefficient of friction at the slipping surface does not vary the effort under which the clutch slips.

9. In a device of the class described, the combination with an engine to be started having a drive shaft, of a hand crank, a fly-wheel, a gear train adapted to apply to the drive shaft a multiplied torque effect from the fly-wheel, said gear train being also adapted to rotate the fly-wheel at relatively high speed from said hand crank, a spring subject to torque from a gear in said train, and a friction driving means having connection with said spring and adapted to slip upon the yielding of the spring.

10. In apparatus of the class described, the combination with an engine having a drive shaft, of an operating shaft, a rotatable mass adapted for acceleration when energy is applied to said operating shaft and to kinetically store said energy, means for applying such stored energy to the drive shaft of the engine for starting, the last said means including a friction drive adapted for slipping under a predetermined load, and a load subject spring of pre-set strength adapted to yield for the control of said slipping.

11. A starting mechanism for an engine having a drive shaft, comprising in combination, a clutching means adapted to engage said drive shaft, a slow speed shaft engaging said clutching means, a high speed shaft, a shaft connecting gear train, a rotatable mass attached to said high speed shaft, a manually operated shaft adapted to apply energy through the gear trains to said mass for kinetic storage therein, said gear train being adapted to transmit such energy to said clutching means, a load spring, and a friction clutch means in the gear train adapted to slip by the yielding of the load spring.

12. In an engine starting mechanism, the combination of a calibrated friction clutch, a rotatable mass associated with the friction clutch, and means for accelerating said mass for the storage of energy therein for delivery to an engine, said means including a torque multiplying gear train and a driving means, said friction clutch being adapted to limit the torque delivered to the engine to less than the torque capacity of the mechanism.

13. In an engine starter, the combination of a power member, a fly-wheel, and means for accelerating the fly-wheel to relatively high speed from said power member, said means being adapted to transmit a multiplied torque from the fly-wheel to the engine to be started, and said transmitting means including a yielding clutch adapted to automatically limit the torque so transmitted to a predetermined amount.

14. In a device for starting an engine or the like, the combination of, a power means, a power transmitting means, a fly-wheel connected to said transmitting means and adapted to be accelerated to high speeds from said power means and engaging means associated with the power transmitting means for drivably connecting the fly wheel to the engine, said transmitting means including a friction clutch adapted to yield under a predetermined driving load for the suppression of excessive loads when said connection is established.

15. In a device for storing energy and applying the same to a means to be started, the combination of an operating shaft, a fly-wheel, a gear train connecting the operating shaft to the fly-wheel for the high speed rotation thereof, a ratchet connection associated with the operating shaft to prevent the forward rotation thereof by the fly-wheel, means including the gears for drivably connecting the fly-wheel to the means to be started, and a spring applied frictional driving means incorporated in the gear train wherein the spring is organized to release the friction when the driving load shall exceed the spring pressure.

16. In an engine starter, the combination with an engine shaft having engaging means, of a high speed shaft, and intermediate speed shaft, a low speed shaft, gears drivably connecting said shafts, a fly-wheel on the high speed shaft, a calibrated friction clutch means on the intermediate speed shaft, and a positive clutch means on the low speed shaft adapted to engage the engine shaft.

17. A starter for an engine, comprising in combination, a flywheel, means for driving the flywheel to a high speed of rotation, a train of gears forming a drive transmission adapted to deliver a multiplied torque from said flywheel to an engine to be started, and in said train of gears a slippable friction clutch means having uniform resistance to the starting of and to the continuation of the slipping action.

18. The combination with an engine to be started, of a starter comprising a rotatable mass adapted for acceleration to high speed, and a drive transmitting means between the rotatable mass and the engine, said drive transmitting means including a friction clutch means having a friction producing load spring and in which means the spring is opposed to the drive for yielding at a pre-set load to cause a slippage of the friction clutch means whenever such pre-set load would otherwise be exceeded.

19. In a device for the starting of a power plant, the combination of a mass means for accumulating energy therein by acceleration of said mass to rotation at high velocity, and means for applying such accumulated energy to the power plant to be started, said applying means including a frictional driving connection adapted to start and to continue slipping at a pre-set load and to drive without slipping at all loads less than that pre-set.

20. In apparatus of the class described, the combination with an engine to be started, of a fly-wheel adapted for the accumulation of energy, a driving connection therebetween including a driving spring, and a friction clutch means associated with the driving spring and normally applied by a pre-set pressure of said driving spring so that such friction applying pressure shall be relieved when the driving load exceeds the pre-set pressure.

21. The combination with an engine to be started, of a friction clutch means having a drive subject spring and adapted by the yielding of said spring to deliver a constant torque when slipping, a fly-wheel, and a torque multiplying gear between the fly-wheel and the engine in which the friction clutch means is incorporated.

22. In apparatus of the class described, the combination with an engine to be started, of a high speed shaft, a low speed shaft, a fly-wheel on the high speed shaft, manually operated driving means associated with the low speed shaft, clutching means for connecting the low speed shaft to the engine, and a gear train connecting said shafts, said gear train including slipping clutch means constituted to deliver a fixed driving effort at the instant of starting and to continue to do so while slipping.

23. The combination with an engine having an engageable shaft, of an inertia device adapted for high speed of rotation independently of said engine, a separable driving clutch to engage the shaft, calibrated spring means, and a normally engaged frictional drive transmitting means having connection with the inertia device and the separable clutch, said frictional drive transmitting means being controlled by the spring means to yield at a pre-set limit when connection is established between the clutch and the engine shaft.

24. In an engine starter mechanism, the combination of a power member, coacting frictionally engaged driving means, spring means for applying friction creating pressure on said driving means, the spring means being organized with respect to the driving action to vary the friction creating pressure inversely to any variation in the friction coefficient of the friction means whenever the driving load exceeds a preset maximum, a fly-wheel adapted to be driven from the power member, and a connecting means for driving the engine from said fly-wheel, said friction means being included in the connecting means.

25. The combination with an engine having a drive shaft provided with engaging means, of an axially shiftable clutch adapted to mesh with said engaging means, a reduction gear train including a low speed gear, said clutch being rotatable by the low speed gear, a high speed flywheel initially drivable from a source of power applied through said train and adapted to subsequently drive the shiftable clutch by means of said train, and a frictional control means incorporated in the train; said control means being adapted to limit the driving effort of the flywheel on the clutch when the same encounters resistance in excess of a predetermined amount.

26. In apparatus of the class described, the combination with an engine having a drive shaft, of a fly-wheel, a gear train, a clutch means driven from the fly-wheel through said train and adapted to engage the drive shaft for rotation, an adjustable slipping friction drive incorporated in the gear train, said friction drive being adapted to be pre-set to transmit a predetermined load from the fly-wheel to the drive shaft, means for initially rotating the fly-wheel to high speed through the gear train, and means adapted to mesh the clutch with the drive shaft when the fly-wheel has attained high speed.

27. In a device for operating a means to be started, the combination of a main cranking shaft, an auxiliary cranking shaft geared thereto, a fly-wheel adapted for high speed rotation from said main shaft for the storage of energy therein, and a torque multiplying means connected to the fly-wheel and normally non-engaging the means to be started and adapted to be connected thereto in a manner so as to apply the multiplied effect from said means directly to the means to be started.

28. In an engine starting mechanism, a gear train having a high speed shaft and a low speed shaft drivably connected, a flywheel on the high speed shaft, a shiftable meshing member on the low speed shaft adapted to engage and disengage an engine to be started, and an operating means for said meshing member including means whereby the meshing member is always urged towards either the fully meshed or fully demeshed position.

29. A meshing device in an engine starter, comprising in combination, a low speed shaft, a member on the shaft adapted to engage and disengage the engine to be started, means tending to urge said member away from the semi-meshed position into the fully meshed or fully demeshed position, a power storing fly-wheel adapted for high speed rotation, and a gear train drivably connecting the fly-wheel to said low speed shaft.

30. An engine meshing device in a starter comprising in combination, a meshing member adapted to be axially moved into a meshed position by manual means and into a demeshed position by the starting of an engine, and spring means tending to urge the meshing member away from the semi-meshed position.

31. In starting apparatus having a meshing member for engaging and disengaging an engine to be started, the combination of a manually operable means for actuating said member axially towards mesh position, means adapted to produce demesh of said member upon the over-run of the engine when started and a toggle spring means tending to urge said meshing member towards the extremes of its meshing or demeshing movement.

32. In a starting apparatus having a meshing member adapted to engage an engine to be started, the combination of a means for manually operating said meshing member towards an engaged position, said means including a first spring, a second spring, and a toggle connection therebetween whereby the first spring is adapted to overcome the second spring for the sudden movement of the meshing member to fully meshed position.

33. In a starting mechanism having a member adapted to engage an engine to be started, the combination of a manually operated means including a spring for producing such engaging action, a toggle and a further spring means opposing said engaging action, the whole being organized to cause the first spring means when operated to overcome the second spring means in the operation of the toggle to insure instantaneous full mesh of the engaging parts.

34. In a starting device, the combination with a rotatable means to be started and having an engageable member, of an inertia device adapted for high speed of rotation independently of said means, a power means adapted to operate the inertia device, a separable driving clutch to engage said member, calibrated spring means, and a normally engaged drive transmitting means having frictional engaging surfaces and having connection with both the inertia device and the clutch, said drive transmitting means being controlled by the spring means to relieve the frictional engagement at a pre-set limit of the spring when said rotatable means is started.

35. An engine starting mechanism comprising in combination, a gear train, a flywheel mounted for rotation and drivably connected to said gear train, a shiftable starting clutch driven from a gear in said train and adapted to engage an engine member, a shaft for driving said gear train, a one-way driving clutch on said shaft, means for shifting the starting clutch, means for driving the shaft, means adapted to effect a release of the one-way clutch when the starting clutch is engaging the engine member, and a slipping friction clutch incorporated in said gear train and comprising a pre-set yielding means to control the slipping of said clutch.

36. The combination with an internal combustion engine having an engageable member, of a gear train, a fly-wheel, a slippable friction clutch, driving means in said gear train, a means to operate the fly-wheel through said gear train and clutch, and an element adapted to engage said engine member for starting and driven from said gear train by the utilization of energy initially stored in the fly-wheel.

37. The combination with an internal combustion engine having an engageable member, of a gear train, a fly-wheel, a clutch member adapted to be shifted into a meshed or demeshed position with the engine member, said clutch being driven from said fly-wheel through said gear train, and a yieldable frictional driving means between said fly-wheel and clutch, a clutch shifting means comprising a spring tending to urge the clutch into either full meshed or full demeshed position, manually operated yieldable means adapted to move the clutch over an intermediate position for meshing, and means on the clutch actuated by the engine member to move said clutch over the intermediate position for demeshing.

38. In a device of the class described, the combination with a shaft to be rotated of a rotatable fly-wheel, a clutch adapted for engagement with the shaft, a spring means, manually operated means assisted by said spring means to effect an engagement of the clutch, automatic means including said spring means to effect a disengagement upon over-run of the engine, a gear train between said fly-wheel and said clutch, means operable to effect high speed rotation of the fly-wheel, and a friction clutch forming a yieldable pre-set drive transmission in said gear train.

39. In apparatus of the class described, the combination with a means to be started, of an operating shaft, a fly-wheel, a gear train connecting the operating shaft to the fly-wheel for the high speed rotation thereof, a ratchet connection associated with the operating shaft to prevent the forward rotation thereof by the fly-wheel, means including the gear train for drivably connecting the fly-wheel to the means to be started, said ratchet connection being non-drivably separated when the engine is started, and a spring applied frictional driving means incorporated in the gear train wherein the spring serves to release the friction when the driving load exceeds the spring pressure.

40. In an engine starter the combination of a hand crank, a fly-wheel, gearing therebetween adapted for the relatively high speed rotation of the fly-wheel from the hand crank and for the low speed driving of the engine to be started from said fly-wheel, a frictionally engaged driving means in said gearing, means for manually adjusting the slipping load of the frictional driving means, and automatic means for maintaining said load constant despite the condition of the slipping surfaces.

41. In a starting device, the combination with an engine having an engageable member, of an operating shaft, a fly-wheel, a gear train connecting the operating shaft to the fly-wheel for the high speed rotation thereof, a starting means driven from the fly-wheel through said gear train and adapted to be moved into a meshed position with the engageable member, and a ratchet connection associated with the operating shaft to prevent the forward rotation thereof by the fly-wheel, said ratchet connection being interconnected with the starting means, for disengagement when said starting means is moved into a meshed position.

Signed at Keyport in the county of Monmouth and State of New Jersey this 10th day of March, A. D. 1924.

ROLAND CHILTON.